United States Patent
Yang et al.

(10) Patent No.: US 11,994,442 B2
(45) Date of Patent: May 28, 2024

(54) UNDERWATER EXPLOSION PRESSURE TEST EXPERIMENT SYSTEM AND METHOD

(71) Applicant: CHINA UNIVERSITY OF MINING & TECHNOLOGY-BEIJING, Beijing (CN)

(72) Inventors: Renshu Yang, Beijing (CN); Liyun Yang, Beijing (CN); Jinjing Zuo, Beijing (CN); Chenxi Ding, Beijing (CN); Yuh. J Chao, Beijing (CN)

(73) Assignee: CHINA UNIVERSITY OF MINING & TECHNOLOGY-BEJING, Beijing (CN)

( * ) Notice: Subject to any disclaimer, the term of this patent is extended or adjusted under 35 U.S.C. 154(b) by 506 days.

(21) Appl. No.: 17/283,695

(22) PCT Filed: Jul. 17, 2019

(86) PCT No.: PCT/CN2019/096419
§ 371 (c)(1),
(2) Date: Apr. 8, 2021

(87) PCT Pub. No.: WO2020/206865
PCT Pub. Date: Oct. 15, 2020

(65) Prior Publication Data
US 2021/0348975 A1    Nov. 11, 2021

(30) Foreign Application Priority Data

Apr. 11, 2019  (CN) .......................... 201910296952.5

(51) Int. Cl.
*G01L 5/14* (2006.01)
*G06T 1/00* (2006.01)
(Continued)

(52) U.S. Cl.
CPC .............. *G01L 5/14* (2013.01); *G06T 1/0007* (2013.01); *G06T 7/246* (2017.01); *G06T 7/292* (2017.01)

(58) Field of Classification Search
CPC ........ G16B 20/00; G16B 20/20; G16B 20/40; G16B 30/00; G01L 5/14; G06T 1/0007; G06T 7/246; G06T 7/292
See application file for complete search history.

(56) References Cited

U.S. PATENT DOCUMENTS

2007/0221863 A1    9/2007    Zipf

FOREIGN PATENT DOCUMENTS

| CN | 102749650 A | 10/2012 |
| CN | 104034468 A | 9/2014 |

(Continued)

OTHER PUBLICATIONS

International Search Report conducted for PCT/CN2019/096419, dated Jan. 16, 2020.

*Primary Examiner* — Andre J Allen
(74) *Attorney, Agent, or Firm* — Frank Gao, Esq.

(57) ABSTRACT

The embodiment of the present invention discloses an underwater explosion pressure test experiment system and method. The invention including: container and drug pack are used to simulate underwater explosion scenes. Projector projects scattered speckles on the water surface. Two high-speed cameras collect images of the first water surface fluctuation. The strain at a certain point in the first water surface is calculated according to the scattered speckles. The K value of the corresponding explosive is calculated from the elastic modulus of the strain and water, and based on the calculated K value, the curve of the explosion pressure at different points in the water with the distance from the explosion source is calculated according to the formula, and the explosion pressure at any point in the water is deter- (Continued)

mined according to the curve. The invention is suitable for use in an underwater explosion pressure measurement experiment.

9 Claims, 1 Drawing Sheet

(51) Int. Cl.
*G06T 7/246* (2017.01)
*G06T 7/292* (2017.01)

(56) References Cited

FOREIGN PATENT DOCUMENTS

| | | | | | |
|---|---|---|---|---|---|
| CN | 107131842 | A | | 9/2017 | |
| CN | 108061789 | A | * | 5/2018 | ............. G01N 21/84 |
| CN | 108061789 | A | | 5/2018 | |
| CN | 108120816 | A | | 6/2018 | |
| CN | 109100072 | A | * | 12/2018 | ............... G01L 5/14 |
| CN | 109100072 | A | | 12/2018 | |
| CN | 109974915 | A | | 7/2019 | |
| CN | 209764322 | U | | 12/2019 | |
| CN | 108120816 | B | * | 10/2020 | ............. G01N 21/84 |
| CN | 112504033 | A | * | 3/2021 | |
| CN | 113139285 | A | * | 7/2021 | ........... G01N 33/227 |

* cited by examiner

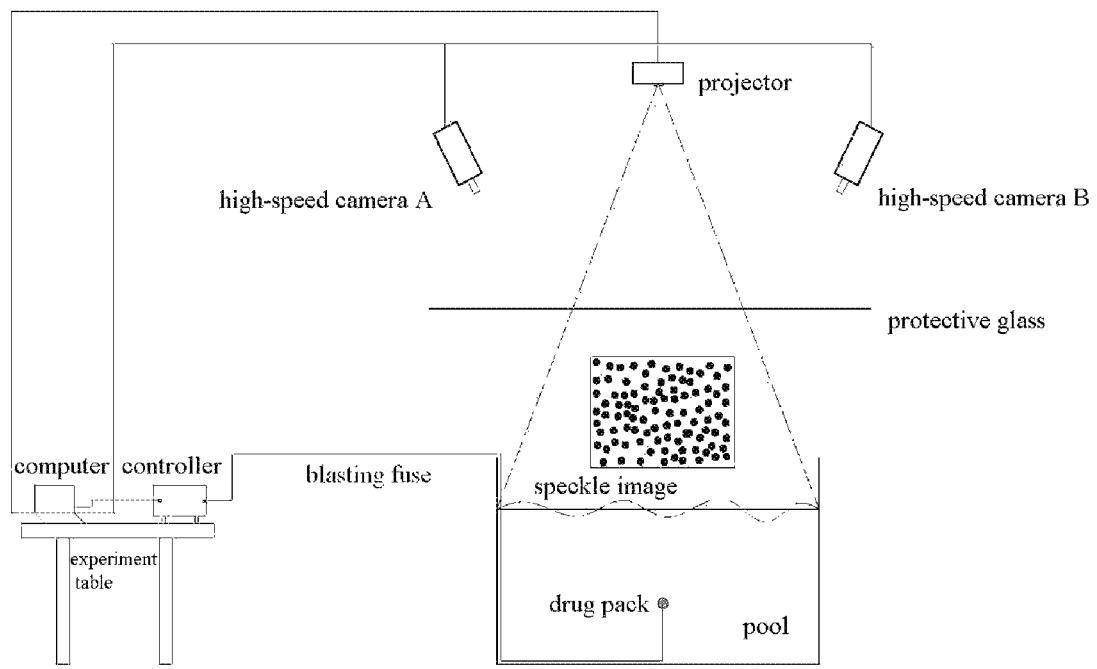

UNDERWATER EXPLOSION PRESSURE TEST EXPERIMENT SYSTEM AND METHOD

CROSS-REFERENCE TO RELATED APPLICATIONS

This application claims priority of a PCT application No. PCT/CN2019/096419, titled as "'UNDERWATER EXPLOSION PRESSURE TEST EXPERIMENT SYSTERM AND METHOD,' filed Jul. 17, 2019, and Chinese Invention Patent Application No. 201910296952.5, entitled as 'UNDERWATER EXPLOSION PRESSURE TEST EXPERIMENT SYSTERM AND METHOD', filed Apr. 11, 2019, which are incorporated herein by reference in their entirety.

TECHNICAL FIELD

The invention relates to the technical field of explosive mechanics measurement test, in particular to an experiment system and method of underwater explosion pressure test.

BACKGROUND TECHNIQUE

With the development of nuclear power plants and water surrounding buildings involving the marine engineering and transportation equipment industry, the measurement of the impact pressure generated by the underwater explosion has begun to be valued and studied by people in the relevant technical fields.

In the process of implementing the present invention, the inventors have found that the existing measurement scheme for the underwater explosion pressure is generally measured by a device composed of a sensor or the like, which increased the operation difficulty accordingly due to the large amount of work in the water.

In view of this, theoretical exploration and experimental research on the underwater explosion pressure measurement scheme are urgently needed to provide a new technical solution for the measurement of underwater explosion pressure.

SUMMARY OF THE INVENTION

In order to solve the above technical problem, embodiments of the present invention provide an underwater explosion pressure test experiment system and method, which is simple and convenient to operate, and can be applied to the measurement of the underwater explosion pressure.

In order to achieve the above object, embodiments of the present invention adopt the following technical solutions:

In a first aspect, an embodiment of the present invention provides an underwater explosion pressure test experiment system, including a container, a drug pack, a controller, protective glass, two high-speed cameras, a projector, a computer, an image analysis module, and an explosion pressure calculation module;

the container, is used for holding liquid;
the drug pack, disposed in the liquid, for generating an explosive source to be measured, causing fluctuations in the water surface;
the controller, is used for controlling the detonation of the drug pack and synchronously triggering the high-speed camera;
the protective glass, located above the container and below the projector, is used to prevent water contained in the container from splashing high into the sky;
the high-speed cameras, are used for image acquisition, capturing images of the surface state of the liquid contained in the container;
the projector, coupled to the computer, is used for projecting computer generated scattered speckles onto the surface of the liquid contained in the container;
the computer, connected to the projector, is used for generating and outputting scattered speckles and controlling the projector; the computer, connected to the controller and the high-speed cameras respectively, is used to receive the controller's synchronous trigger signal and pass it to the high-speed cameras, control the trigger of the high-speed cameras, and receive and store the image captured by the high-speed cameras;
the image analysis module, loaded on the computer, is used for processing and analyzing images acquired by the two high-speed cameras, calculating and outputting the displacement and strain of the water surface based on the images;
the explosion pressure calculation module, mounted on the computer, is used for calculating a surface explosion pressure of the first fluctuating water surface position based on the volume elastic modulus of the water and the calculated strain;
determining a dimensionless parameter K value indicative of explosion energy of the drug pack according to the surface explosion pressure;
Based on the K value, according to the formula $$P_m = K \times \left(\frac{w^{1/3}}{R}\right)^{1.13},$$

the variation curve of the explosion pressure at different points in the water with the distance from the explosion source is calculated; wherein, Pm is the underwater explosion pressure, in units of MPa; R is the distance from the different position to the explosion source, in units of m; w is the amount of explosives, in units of kg;
Based on the variation curve, the explosion pressure at any location in the water is determined.

Preferably, the image analysis module is specifically configured to use digital scattered speckles images of water surface before and after deformation acquired by the high-speed cameras according to the principle of digital image correlation technology, to match the corresponding image sub-area in the digital scattered speckles image before and after the deformation and obtain the displacement of each point on the water surface by tracking the scattered speckles images of the water surface, to realize the measurement and acquisition of the three-dimensional coordinates, displacement and strain value of the water surface during the deformation process.

Preferably, the explosion pressure calculation module is specifically configured to calculate the surface explosion pressure of the first fluctuation position according to the formula $P_0 = \varepsilon \times E$; wherein $\varepsilon$ is the strain value of the first scattered speckle on the water surface obtained according to the image analysis module; E is the elastic modulus of water, which is $2.18 \times 10^9$ Pa; $P_0$ is the surface explosion pressure in units of MPa.

Preferably, the dimensionless parameter K value for characterizing the explosion energy of the drug pack determined according to the surface explosion pressure comprises: substituting the water surface explosion pressure, the distance R of the first scattered speckle from the explosion source, and the explosive amount w into the formula $$P_n = K \times \left(\frac{w^{1/3}}{R}\right)^{1.13},$$

and calculating the dimensionless parameter K value characterizing the explosion energy of the drug pack; wherein Pn is the surface explosion pressure.

In a second aspect, an embodiment of the present invention further provides an experimental method for testing an underwater explosion pressure, comprising:

adding water to the container;
providing a projector above the container;
adjusting the height of the projector to the water surface in the container to a first predetermined height, so that the scattered speckles projected by the projector are clearly displayed on the water surface;
providing a drug pack in the container;
collecting images of the water surface before and after the explosion of the drug pack;
obtaining a first image of a water surface state before detonation, and selecting a first reference sub-region in the first image;
obtaining a second image of the water surface state after detonation, and acquiring a first target sub-region corresponding to the first reference sub-region;
determining a displacement of the first fluctuating water surface position according to the first reference sub-region and the first target sub-region;
deriving a strain of the first fluctuating water surface based on the displacement;
calculating a surface explosion pressure of the first fluctuating water surface position based on the volume elastic modulus of the water and the determined strain;
determining a dimensionless parameter K value indicative of an explosion energy of the drug pack according to the surface explosion pressure;
based on the K value, according to the formula $$P_m(MPa) = K \times \left(\frac{w^{1/3}}{R}\right)^{1.13},$$

the variation curve of the explosion pressure at different points in the water with the distance from the explosion source is calculated; wherein, Pm is the underwater explosion pressure, in units of MPa; R is the distance of the different position from the explosion source, in units of m; w is the amount of explosives, in units of kg;

based on the variation curve, the explosion pressure at any position in the water is determined.

Preferably, before or after or simultaneously with adding water to the container, the method further comprises: adding an opaque liquid or water-soluble substance to the container to mix the opaque liquid or water-soluble substance with water to form an opaque mixture.

Preferably, the water surface explosion pressure of the first fluctuating position is calculated based on the obtained strain and the elastic modulus of water: calculating a water surface explosion pressure of the first fluctuating position according to the formula $P_0 = \varepsilon \times E$; wherein, $\varepsilon$ is the strain of the first scattered speckle on the water surface; the E is the elastic modulus of water, which is $2.18 \times 10^9$ Pa; $P_0$ is the surface explosion pressure, in units of MPa.

The dimensionless parameter K value for characterizing the explosion energy of the drug pack determined according to the surface explosion pressure comprises: substituting the water surface explosion pressure, the distance R from the first scattered speckle to the explosion source, and the explosive amount w into the formula $$P_m(MPa) = K \times \left(\frac{w^{1/3}}{R(m)}\right)^{1.13},$$

and calculating the dimensionless parameter K value characterizing the explosion energy of the drug pack; wherein Pm is the underwater explosion pressure.

Preferably, before or after or simultaneously adding water to the container, the method further comprises: adding an opaque liquid or a water-soluble substance to the container to mix the opaque liquid or water-soluble substance with water to form an opaque mixture, so that no reflection or transmission occurs when the scattered speckles is transmitted to the opaque surface.

Preferably, the water surface explosion pressure of the first fluctuating position is calculated based on the obtained strain and the elastic modulus of water: calculating a water surface explosion pressure of the first fluctuating position according to the formula $P_0 = \varepsilon \times E$; wherein, $\varepsilon$ is the strain of the scattered speckle on the water surface; the E is the elastic modulus of water, which is $2.18 \times 10^9$ Pa; $P_0$ is the surface explosion pressure, in units of MPa.

Preferably, the dimensionless parameter K value for characterizing the explosion energy of the drug pack determined according to the surface explosion pressure comprises: substituting the water surface explosion pressure, the distance R of the first scattered speckle from the explosion source, and the explosive amount w into the formula $$P_n = K \times \left(\frac{w^{1/3}}{R}\right)^{1.13},$$

the K value of the dimensionless parameter characterizing the explosion energy of the drug pack is calculated; wherein Pn is the surface explosion pressure.

Preferably, the displacement of the first wave surface position determined according to the first reference sub-region and the first target sub-region comprises:

Obtaining a center point coordinate of the first reference sub-region;
Obtaining coordinates corresponding to the coordinates of the center point in the first target sub-region;
The displacement of the first fluctuating water surface position is obtained according to the coordinates of the center point and the coordinates corresponding to the coordinates of the center point.

The underwater explosion pressure test experiment system and method provided by the embodiment of the invention comprises a container, a drug pack, a controller, a protective glass, two high-speed cameras, a projector, a computer, an image analysis module and an explosion pressure calculation module; The above scheme simulates an underwater explosion test, generates scattered speckles on the water surface by setting a projector above the water surface, collects an image of the first water surface fluctuation, and calculates a strain at a certain point in the first water surface according to the scattered speckles. The K value of the corresponding explosive is calculated from the elastic modulus of the strain and water, and based on the calculated K value, the curve of the explosion pressure at different points in the water with the distance from the explosion source is calculated according to the formula. The curve determines the explosion pressure at any point in the water. The underwater explosion pressure test system is almost entirely laid on the water surface, and the operation is simple and convenient. It can be applied to the determination of underwater explosion pressure, and it is convenient to carry out theoretical exploration and experimental research on the underwater explosion pressure measurement program in the laboratory.

BRIEF DESCRIPTION OF THE DRAWINGS

In order to more clearly illustrate the embodiments of the present invention or the technical solutions in the prior art, the drawings used in the embodiments or the description of the prior art will be briefly described below. Obviously, the drawings in the following description are only certain embodiments of the present invention, and other drawings can be obtained from these drawings by those skilled in the art without any creative work.

FIG. 1 is a schematic structural view of an embodiment of an underwater explosion pressure test experiment system according to an embodiment of the present invention.

DETAILED DESCRIPTION OF THE EMBODIMENTS

The embodiments of the present invention are described in detail below with reference to the accompanying drawings.

It should be understood that the described embodiments are only a part of the embodiments of the invention, and not all of the embodiments. All other embodiments obtained by a person of ordinary skill in the art based on the embodiments of the present invention without departing from the inventive scope are the scope of the present invention.

Referring to FIG. 1, an underwater explosion pressure test experiment system according to an embodiment of the present invention is applicable to theoretical exploration and experimental research on a underwater explosion pressure measurement program in a laboratory to provide a new technical solution suitable for underwater explosion pressure measurement. The underwater explosion pressure includes the surface explosion pressure and the explosion pressure in water.

The system includes a container, a drug pack, a controller, protective glass, two high-speed cameras, a projector, a computer, an image analysis module, and an explosion pressure calculation module.

the container is used for holding liquid; the liquid comprises water; the drug pack, disposed in the liquid for generating a measured explosion source to cause fluctuations in the water surface; and the controller is used for controlling the initiation of the package and synchronously triggering the high-speed camera; the protective glass, located above the container and below the projector, is used to prevent water in the container from splashing high into the sky; the high-speed cameras are used for image acquisition, capturing images of the surface state of the liquid contained in the container; the projector, connected to the computer, is used for projecting a computer generated scattered speckles into the surface of the liquid contained in the container; the computer, connected to the projector, is used for generating and outputting scattered speckles and controlling the projector; the computer, connected to the controller and the high-speed cameras respectively, is used to receive the controller's synchronous trigger signal and pass it to the high-speed cameras, control the trigger of the high-speed cameras, and receive and store the image captured by the high-speed cameras;

the image analysis module, loaded on the computer, is used for processing and analyzing images acquired by the two high-speed cameras, calculating and outputting the displacement and strain of the water surface based on the images; the explosion pressure calculation module, mounted on the computer, is used for calculating a surface explosion pressure of the first fluctuating water surface position based on the volume elastic modulus of the water and the calculated strain;

Determining a dimensionless parameter K value indicative of an explosion energy of the drug pack according to the surface explosion pressure; Based on the K value, according to the formula $$P_m = K \times \left(\frac{w^{1/3}}{R}\right)^{1.13},$$

the variation curve of the explosion pressure at different points in the water with the distance from the explosion source is calculated; wherein, Pm is the underwater explosion pressure, in units of MPa; R is the distance from the different position to the explosion source, in units of m; w is the amount of explosives, in units of kg; Based on the variation curve, the explosion pressure at any location in the water is determined.

The underwater explosion pressure test experiment system and method provided by the embodiment of the invention comprises a container, a drug pack, a controller, a protective glass, two high-speed cameras, a projector, a computer, an image analysis module and an explosion pressure calculation module; In this way, by adopting the above scheme, the underwater explosion test is simulated, and the scattered speckles are projected on the water surface by setting a projector above the water surface, and an image of the first water surface fluctuation is acquired, and the strain of the point in the first water surface is calculated by using the scattered speckles. The K value of the corresponding explosive is calculated from the elastic modulus of the strain and water, and based on the calculated K value, the curve of the explosion pressure at different points in the water with the distance from the explosive source is calculated according to the formula. Based on the curve, the explosion pressure at any point in the water can be determined. The underwater explosion pressure test system is almost entirely provided above the water surface, and the operation is simple and convenient. It can be applied to the determination of underwater explosion pressure, and it is convenient to carry out theoretical exploration and experimental research on the underwater explosion pressure measurement program in the laboratory.

Wherein, the image analysis module is specifically configured to use digital scattered speckles images of water surface before and after deformation acquired by the high-speed cameras according to the principle of digital image correlation technology, to match the corresponding image sub-area in the digital scattered speckles image before and after the deformation and obtain the displacement of each point on the water surface by tracking the scattered speckles images of the water surface, to realize the measurement and acquisition of the three-dimensional coordinates, displacement and strain value of the water surface during the deformation process.

In an embodiment of the present invention, the explosion pressure calculation module is specifically configured to calculate the water surface explosion pressure of the first fluctuating position according to the formula $P_0=\varepsilon \times E$; wherein $\varepsilon$ is the strain value of the first scattered speckle on the water surface obtained according to the image analysis system. The E is the elastic modulus of water, which is $2.18 \times 10^9$ Pa; $P_0$ is the surface explosion pressure, in units of MPa.

In another embodiment of the present invention, the dimensionless parameter K value for characterizing the explosion energy of the drug pack determined according to the surface explosion pressure comprises: the surface explosion pressure, the distance R of the first scattered speckle to the explosion source, and the amount of explosive w is substituted into the formula $$P_n = K \times \left(\frac{w^{1/3}}{R}\right)^{1.13},$$

and the dimensionless parameter K value characterizing the explosion energy of the drug pack is calculated; wherein $P_n$ is the surface explosion pressure. In this embodiment, the explosive used in the experiment is a TNT explosive. When the explosive used is another explosive, the formula $$P_n = K \times \left(\frac{w^{1/3}}{R}\right)^{1.13}$$

is the formula $$P_n = K \times \left(\frac{w^{1/3}}{R}\right)^{1.13} \times \left(\frac{Q_1}{Q_2}\right)^{0.377},$$

wherein $Q_1$ is the explosive heat of the explosive used, and $Q_2$ is the explosive heat of TNT.

Embodiment 2

Referring to FIG. 1, an underwater explosion pressure test method according to an embodiment of the present invention is applicable to theoretical exploration and experimental research on a underwater explosion pressure measurement program in a laboratory to provide a new technical solution suitable for underwater explosion pressure measurement. The method includes:

Step 101, adding water to the container; setting a projector above the container; it can be understood that the liquid is subjected to force, and the liquid surface may fluctuate, and accordingly, there is a bulging area or point, commonly known as a bulge bag. For the convenience of the study of the bulge point, project scattered speckles on the water surface, the scattered speckles fluctuate with the fluctuation of the water surface. Therefore, the state of the scattered speckles can be studied to determine the fluctuation state of the water after the impact force is applied.

Step 102: Adjusting a height of the projector to a water surface in the container to a first predetermined height, so that the scattered speckles projected by the projector are clearly displayed on the water surface; specifically, the predetermined height is correlative to the container size and the projector lens, etc.; the brightness of the projector matches the exposure speed required for the high-speed camera shooting rate, which can be set according to the actual situation.

Step 103, providing a drug pack in the container;

Step 104: Collecting images of the water surface before and after the explosion of the drug pack;

Step 105: Obtaining a first image of a water surface state before detonation, and selecting a first reference sub-region in the first image;

Step 106: Obtaining a second image of the water surface state after detonation, and acquiring a first target sub-region corresponding to the first reference sub-region;

Step 107: Determining a displacement of the first fluctuating water surface position according to the first reference sub-region and the first target sub-region;

Step 108: Deriving a strain of the first fluctuating water surface based on the displacement;

Step 109: Calculating a surface explosion pressure of the first fluctuating water surface position based on the volume elastic modulus of the water and the determined strain;

Step 110: Determining a dimensionless parameter K value indicative of an explosion energy of the drug pack according to the surface explosion pressure;

Step 111: Based on the K value, according to the formula $$P_m = K \times \left(\frac{w^{1/3}}{R}\right)^{1.13},$$

the variation curve of the explosion pressure at different points in the water with the distance from the explosion source is calculated; wherein, Pm is the underwater explosion pressure, in units of MPa; R is the distance from the different position to the explosion source, in units of m; w is the amount of explosives, in units of kg;

Step 112: Determining an explosion pressure at any position in the water based on the variation curve;

The underwater explosion pressure testing method provided by the embodiment of the invention comprises: adding water to the container; setting a projector above the container; Adjusting the height of the projector to the water surface in the container to a first predetermined height, so that the scattered speckles projected by the projector are clearly displayed on the water surface; Providing a drug pack in the container; Detonating the drug pack and collecting a first image of the water surface fluctuation; obtaining the first fluctuating water surface position according to the first image; calculating a surface explosion pressure of the first fluctuating position based on the obtained strain and water elastic modulus; Determining a dimensionless parameter K value indicative of an explosion energy of the drug pack according to the surface explosion pressure; Based on the K value, according to the formula $$P_m = K \times \left(\frac{w^{1/3}}{R}\right)^{1.13},$$

the variation curve of the explosion pressure at different points in the water with the distance from the explosion source is calculated; Based on the variation curve, the explosion pressure at any position in the water is determined. In this way, by adopting the above scheme, the underwater explosion test is simulated, and the scattered speckles are projected on the water surface by setting a projector above the water surface, and an image of the first water surface fluctuation is acquired, and the strain of the point in the first water surface is calculated by using the scattered speckles. The K value of the corresponding explosive is calculated from the elastic modulus of the strain and water, and based on the calculated K value, the curve of the explosion pressure at different points in the water with the distance from the source is calculated according to the formula. The curve determines the explosion pressure at any point in the water. The underwater explosion pressure test system is almost entirely provided above the water surface, and the operation is simple and convenient. It can be applied to the determination of underwater explosion pressure, and it is convenient to carry out theoretical exploration and experimental research on the underwater explosion pressure measurement program in the laboratory.

In this embodiment, it can be understood that the water is a transparent liquid. In the experiment, the scattered speckles that are projected onto the water surface will partially pass through the water surface into the water layer, which will affect subsequent observation and experimental analysis; During the experiment, in order that the scattered speckles projected by the projector are clearly projected onto the liquid surface for subsequent observation and analysis calculations, it is necessary to prevent the scattered speckles from passing through the transparent liquid. As an alternative embodiment, before or after or simultaneously with adding water to the container, the method further comprises: adding an opaque liquid or a water-soluble substance to the container to mix the opaque liquid or water-soluble substance with water to form an opaque mixture. In this way, almost all of the scattered speckles can be projected onto the liquid surface, which is conducive to the smooth development of subsequent experiments.

In this embodiment, as an optional embodiment, the water surface explosion pressure of the first fluctuating position is calculated based on the obtained strain and the elastic modulus of water: calculating the first surface explosion pressure of the first fluctuating position according to the formula $P_0=\varepsilon \times E$; wherein $\varepsilon$ is the strain of the first scattered speckle on the water surface; the E is the elastic modulus of water, which is $2.18 \times 10^9$ Pa; $P_0$ is the surface explosion pressure, in units of MPa.

The dimensionless parameter K value for characterizing the explosion energy of the drug pack determined according to the surface explosion pressure comprises: substituting the water surface explosion pressure, the distance R of the first scattered speckle from the explosion source, and the explosive amount w into the formula $$P_n = K \times \left(\frac{w^{1/3}}{R}\right)^{1.13},$$

and calculating the dimensionless parameter K value characterizing the explosion energy of the drug pack; wherein Pn is the surface explosion pressure. In this embodiment, as another optional embodiment, the determination of the displacement of the first fluctuating water surface position, according to the first reference sub-region and the first target sub-region, comprises:

Obtaining a center point coordinate of the first reference sub-region;

Obtaining coordinates corresponding to the center point coordinate in the first target sub-region;

The displacement of the first fluctuating water surface position is obtained according to the coordinates of the center point and the coordinates corresponding to the coordinates of the center point.

It can be understood that, in this embodiment, in order to determine the explosion pressure by deformation of a certain point or position on the liquid surface after being subjected to an explosive force, it is necessary to determine the displacement of the point before and after the force. Using digital image correlation analysis and determination method, the present application determines the displacement and strain of the sub-region in the scattered speckles pattern before and after the deformation of the object by a shape function in the process of determining the displacement.

The experimental system and method provided by the embodiments of the present invention are simple and convenient to operate, and a new scheme for measuring the underwater explosion pressure is proposed, and can be applied to the experiment of measuring the underwater explosion pressure.

It should be noted that, in this paper, the aspects of the solutions described in the various embodiments are different, but each embodiment has a certain interrelated relationship. When understanding the solution of the present invention, the embodiments can be mutually referenced. In addition, in the embodiment of the present application, when the technical feature element is fixed on another technical feature element, it may be directly in contact with the surface of another technical feature element, or may be another technical feature element existing in the middle. In addition, relational terms such as first and second are used merely to distinguish one entity or operation from another, and do not necessarily require or imply any such actual relationship or order between the entities or operations. Furthermore, the terms "include" or "comprise" or any other variants are intended to encompass a non-exclusive inclusion, such that a process, method, article, or other elements, or elements that are inherent to such a process, method, item, or station. In the absence of more restrictions, the elements defined by statement "includes one . . . " do not exclude the presence of additional identical elements in the process, method, article, or station that includes the elements.

In addition, those skilled in the art can understand that all or part of the process of implementing the above embodiments may be completed by a computer program to instruct related hardware, and the program may be stored in a computer readable storage medium. The program, when executed, may include the flow of an embodiment of the methods as described above. The storage medium may be a magnetic disk, an optical disk, a read-only memory (ROM), or a random access memory (RAM).

The above is only a specific embodiment of the present invention, but the scope of the present invention is not limited thereto, and any person skilled in the art can easily think of changes or substitutions within the technical scope of the present invention. All should be covered by the scope of the present invention. Therefore, the scope of the invention should be determined by the scope of the claims.

The invention claimed is:

1. An underwater explosion pressure test experiment system, characterized in that, the underwater explosion pressure includes the surface explosion pressure and the explosion pressure in water; the system includes a container, a drug pack, a controller, protective glass, two high-speed cameras, a projector, a computer, an image analysis module, and an explosion pressure calculation module;

the container, is used for holding liquid; the liquid comprises water;

the drug pack, disposed in the liquid, for generating a measured explosion source to cause fluctuations in the water surface;

the controller, is used for controlling the initiation of the package and synchronously triggering the high-speed camera;

the protective glass, located above the container and below the projector, is used to prevent water in the container from splashing high into the sky;

the high-speed cameras, are used for image acquisition, capturing images of the surface state of the liquid contained in the container;

the projector, connected to the computer, is used for projecting a computer generated scattered speckles onto the surface of the liquid contained in the container;

the computer, connected to the projector is used for generating and outputting scattered speckles and controlling the projector; the computer, connected to the controller and the high-speed cameras respectively, is used to receive the controller's synchronous trigger signal and pass it to the high-speed cameras, control the trigger of the high-speed cameras, and receive and store the image captured by the high-speed cameras;

the image analysis module, loaded on the computer, is used for processing and analyzing images acquired by the two high-speed cameras, calculating and outputting the displacement and strain of the water surface based on the images;

the explosion pressure calculation module, mounted on the computer, is used for calculating a surface explosion pressure of the first fluctuating water surface position based on the volume elastic modulus of the water and the calculated strain;

Determining a dimensionless parameter K value indicative of an explosion energy of the drug pack according to the surface explosion pressure;

Based on the K value, according to the formula $$P_m = K \times \left(\frac{w^{1/3}}{R}\right)^{1.13},$$

a variation curve of the explosion pressure at different points in the water with the distance from the explosion source is calculated; wherein, Pm is the underwater explosion pressure, in units of MPa; R is the distance from the different position to the explosion source, in units of m; w is the amount of explosives, in units of kg;

Based on the variation curve, the explosion pressure at any location in the water is determined.

2. The test experiment system according to claim 1, wherein the image analysis module is specifically configured to use digital scattered speckles images of water surface before and after deformation acquired by the high-speed cameras according to the principle of digital image correlation technology, to match the corresponding image sub-area in the digital scattered speckles image before and after the deformation and obtain the displacement of each point on the water surface by tracking the scattered speckles images of the water surface, to realize the measurement and acquisition of the three-dimensional coordinates, displacement and strain value of the water surface during the deformation process.

3. The explosion pressure calculation system according to claim 1, wherein the explosion pressure calculation module is specifically configured to calculate the surface explosion pressure of the first fluctuation position according to the formula $P_0 = \varepsilon \times E$; wherein $\varepsilon$ is the strain value of the first scattered speckle on the water surface obtained according to the image analysis system; E is the elastic modulus of water, which is $2.18 \times 10^9$ Pa; $P_0$ is the surface explosion pressure in units of MPa.

4. The explosion pressure calculation system according to claim 3, wherein the dimensionless parameter K value for characterizing the explosion energy of the drug pack determined according to the surface explosion pressure comprises: substituting the water surface explosion pressure, the distance R of the first scattered speckle from the explosion source, and the explosive amount w into the formula $$P_n = K \times \left(\frac{w^{1/3}}{R}\right)^{1.13},$$

and calculating the dimensionless parameter K value characterizing the explosion energy of the corresponding drug pack; wherein Pn is the surface explosion pressure.

5. An underwater explosion pressure test experiment method, wherein the method consist of steps:

adding water to the container;

providing a projector above the container;

adjusting the height of the projector to the water surface in the container to a first predetermined height, so that the scattered speckles projected by the projector are clearly displayed on the water surface;

providing a drug pack in the container;

collecting images of the water surface before and after the explosion of the drug pack;

obtaining a first image of a water surface state before detonation, and selecting a first reference sub-region in the first image;

obtaining a second image of the water surface state after detonation, and acquiring a first target sub-region corresponding to the first reference sub-region;

determining a displacement of the first fluctuating water surface position according to the first reference sub-region and the first target sub-region;

deriving a strain of the first fluctuating water surface based on the displacement;

calculating a surface explosion pressure of the first fluctuating water surface position based on the volume elastic modulus of the water and the determined strain;

determining a dimensionless parameter K value indicative of an explosion energy of the drug pack according to the surface explosion pressure;

based on the K value, according to the formula $$P_m = K \times \left(\frac{w^{1/3}}{R}\right)^{1.13},$$

a variation curve of the explosion pressure at different points in the water with the distance from the explosion source is calculated; wherein, Pm is the underwater explosion pressure, in units of MPa; R is the distance of the different position from the explosion source, in units of m; w is the amount of explosives, in units of kg; based on the variation curve, the explosion pressure at any position in the water is determined.

6. The method according to claim 5, wherein before or after or simultaneously adding water to the container, the method further comprises: adding an opaque liquid or a water-soluble substance to the container to mix the opaque liquid or water-soluble substance with water to form an opaque mixture, so that no reflection or transmission occurs when the scattered speckles are projected on the opaque surface.

7. The method according to claim 6, wherein the water surface explosion pressure of the first wave position is calculated based on the obtained strain and the elastic modulus of water: calculating a water surface explosion pressure of the first wave position according to the formula $P_0 = \varepsilon \times E$; wherein, $\varepsilon$ is the strain of the first scattered speckle on the water surface; the E is the elastic modulus of water, which is $2.18 \times 10^9$ Pa; $P_0$ is the surface explosion pressure, in units of MPa.

8. The method according to claim 7, wherein the dimensionless parameter K value for characterizing the explosion energy of the drug pack determined according to the surface explosion pressure comprises: substituting the water surface explosion pressure, the distance R of the first scattered speckle from the explosion source, and the explosive amount w into the formula $$P_n = K \times \left(\frac{w^{1/3}}{R}\right)^{1.13},$$

and calculating the dimensionless parameter K value characterizing the explosion energy of the drug pack; wherein $P_n$ is the surface explosion pressure.

9. The method according to claim 5, wherein the displacement of the first wave surface position determined according to the first reference sub-region and the first target subregion comprises:
 obtaining a center point coordinate of the first reference sub-region;
 obtaining coordinates corresponding to the coordinates of the center point in the first target sub-region;
 the displacement of the first fluctuating water surface position is obtained according to the coordinates of the center point and the coordinates corresponding to the coordinates of the center point.

* * * * *